US007011205B2

(12) United States Patent
Draghetti et al.

(10) Patent No.: US 7,011,205 B2
(45) Date of Patent: Mar. 14, 2006

(54) VARIABLE CAPACITY STORE FOR OBJECTS

(75) Inventors: Fiorenzo Draghetti, Medicina (IT);
Roberto Osti, Zola Predosa (IT);
Verter Cesari, Granarolo dell'Emilia (IT)

(73) Assignee: G.D Societa" per Azioni, Bologna (IT)

( * ) Notice: Subject to any disclaimer, the term of this patent is extended or adjusted under 35 U.S.C. 154(b) by 0 days.

(21) Appl. No.: 10/490,084

(22) PCT Filed: Feb. 28, 2002

(86) PCT No.: PCT/IT02/00121

§ 371 (c)(1),
(2), (4) Date: Sep. 17, 2004

(87) PCT Pub. No.: WO03/026988

PCT Pub. Date: Apr. 3, 2003

(65) Prior Publication Data

US 2005/0016819 A1 Jan. 27, 2005

(30) Foreign Application Priority Data

Sep. 24, 2001 (IT) .............................. BO01A0583

(51) Int. Cl.
*B65G 21/18* (2006.01)
(52) U.S. Cl. .................... 198/778; 198/347.1; 198/594

(58) Field of Classification Search ............. 198/347.1, 198/778, 594
See application file for complete search history.

(56) References Cited

U.S. PATENT DOCUMENTS

| 3,682,295 | A | 8/1972 | Roinestad |
| 4,448,301 | A | 5/1984 | Alger |
| 5,361,888 | A | 11/1994 | Brown et al. |
| 6,422,380 | B1 * | 7/2002 | Sikora ........................ 198/812 |
| 6,725,997 | B1 * | 4/2004 | Draghetti ................. 198/347.1 |
| 6,913,132 | B1 * | 7/2005 | Spatafora ................. 198/347.1 |
| 2005/0092578 | A1 * | 5/2005 | Spatafora ................. 198/347.1 |

FOREIGN PATENT DOCUMENTS

| FR | 81 14808 | 2/1983 |
| GB | 1 090 630 | 11/1967 |

* cited by examiner

*Primary Examiner*—Gene O. Crawford
*Assistant Examiner*—Mark A. Deuble
(74) *Attorney, Agent, or Firm*—Ladas & Parry LLP (57) ABSTRACT

A variable-capacity store (1) for objects (2), wherein an endless conveyor (8) defines a conveying branch (11) for conveying a mass of elongated elements (2), and a return branch (14), the conveying branch and the return branch respectively forming a first and at least a second coil (51, 57), each extending about two respective guide drums (26, 27) (43, 44) movable transversely with respect to each other to adjust the length of the respective coil (51) (57); and wherein the conveying surface (10) positioned on edge with respect to the guide drums (26, 27) of the first coil (51), and positioned flat against the guide drums (43, 44) of the second coil (57).

31 Claims, 5 Drawing Sheets

VARIABLE CAPACITY STORE FOR OBJECTS

TECHNICAL FIELD

The present invention relates to a variable-capacity store for objects.

In particular, the present invention relates to a variable-capacity store for objects defined by elongated elements, the store comprising an input station and an output station arranged in series along a feed path of the elongated elements; an endless conveyor comprising a conveying branch for conveying said elongated elements along said path and forming a first coil of a first given length about a pair of first guide drums, and a return branch forming at least a second coil of a second given length about a pair of second guide drums; and adjusting means for adjusting said lengths in complementary manner.

The present invention may be used to advantage for storing cigarettes, to which the following description refers purely by way of example.

BACKGROUND ART

For storing cigarettes, a store of the above type—as described, for example, in EP-0738478 or WO-9944446—is interposed between a cigarette manufacturing machine and a packing machine to compensate for any difference in the number of cigarettes produced and the number packed, by lengthening or shortening said first or conveying coil, and shortening or lengthening said second or return coil in complementary manner.

U.S. Pat. No. 5,361,888 discloses a reversible reservoir for cigarettes or filters including relatively small and relatively large capacity sections arranged in series with a drive for driving these sections at different rates. The small section is preferably arranged adjacent the reservoir inlet and is capable of buffering the main part of the reservoir so that the latter is not required to undergo high accelerations; the reservoir may be in the form of an elongated helix with an endless conveyor passing around spaced columns of wheels, one of the lowermost wheels being bodily movable so as to be capable of imposing an additional velocity on the section of conveyor adjacent the reservoir inlet. The movable wheel is carried on a which also carries a pulley for the conveyor return run; tensioning for the conveyor is provided by arranging for the position of the pulley to be adjustable relative to the beam.

FR2510527 discloses a feed for stocking articles between work positions; the feed is for stocking parts between two work positions and has an endless chain, along which are parts at even distances to hold the parts to be stocked. The chain has a vertical section of variable length; on this are loading supports for the stock, passing over a toothed wheel carried on a slide, which moves vertically and is permanently urged upwards. A second chain section is also of variable length and has unloaders for the stocked parts; a drive operates the chain upwards and another operates the chain downwards.

The conveyor of known stores of the above type is normally defined by a belt, the conveying surface of which is maintained, along the two coils, substantially parallel to itself and substantially on edge, i.e. perpendicular to the axes of the relative guide drums, and is transversely flexible to wind on edge about all the guide drums.

Consequently, known stores are relatively bulky by employing fairly large-radius guide drums along both the conveying and return branch, to prevent excessive tensile stress along the curved portions of the on-edge belt, and, at least as regards the conveying branch, instability of the conveyed mass of cigarettes due to excessively small radii of the curved portions.

DISCLOSURE OF INVENTION

It is an object of the present invention to provide a store of the above type, which, for a given capacity, is smaller in overall size as compared with known stores of the same type.

According to the present invention, there is provided a variable-capacity store for objects as recited by claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
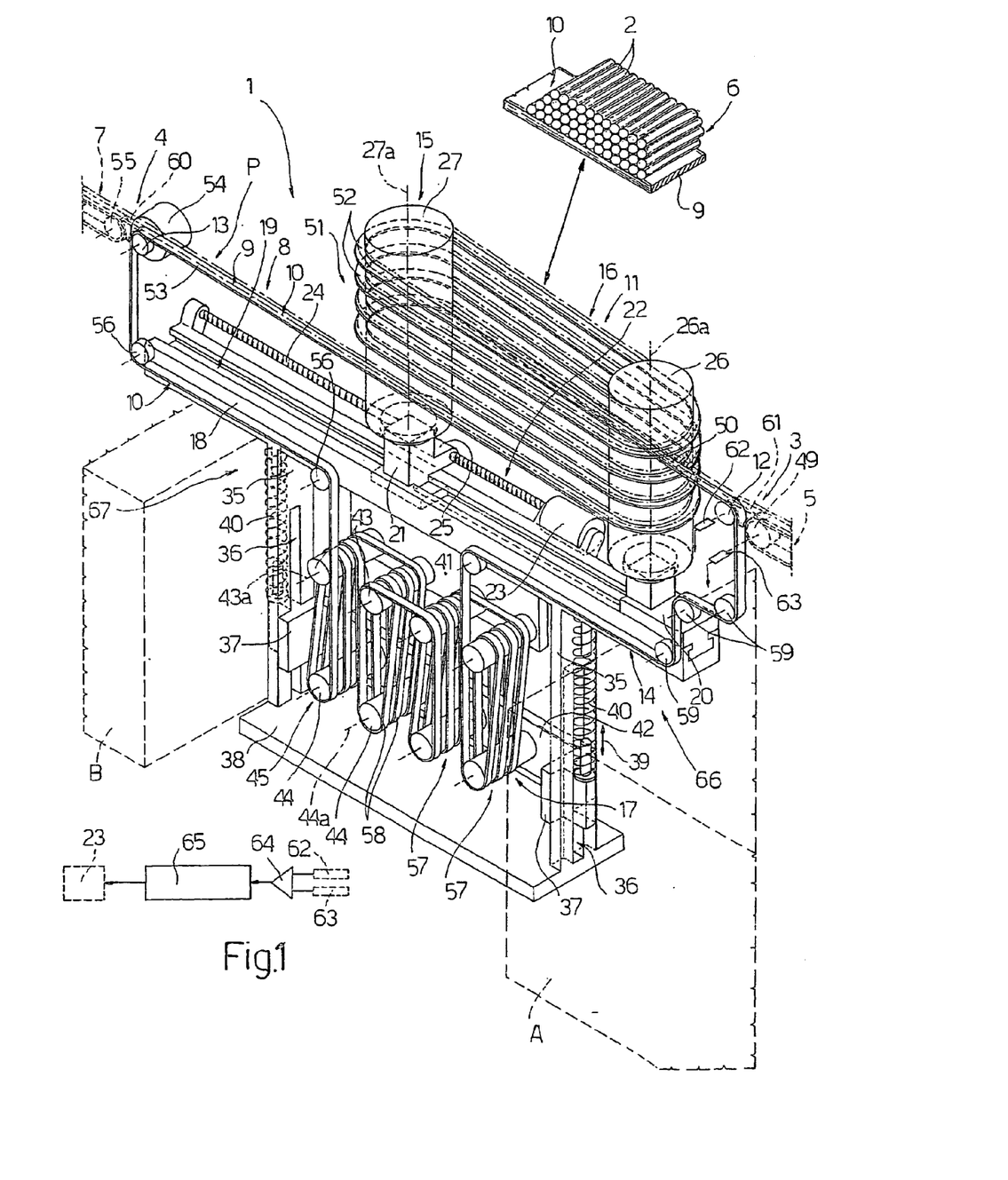
FIG. 1 shows a view in perspective, with parts removed for clarity, of a preferred embodiment of a store in accordance with the present invention.

Number 1 in FIG. 1 indicates as a whole a variable-capacity store for objects defined, for example, by elongated elements 2, in particular cigarettes, and comprising, for elongated elements 2, an input station 3 and an output station 4 arranged in series along a feed path P of elongated elements 2. More specifically, store 1 provides for storing a quantity of elements 2 varying as required within a given range, and for supplying station 4 with the elements 2 fed first, in use, to store 1 at station 3.

Store 1 receives a number of elements 2, arranged in bulk in a continuous stream 6, from a conveyor 5 located at input station 3 and connected to the output of a manufacturing machine A, and feeds elements 2 to a conveyor 7 located at output station 4 and terminating at the input of a packing machine B.

Store 1 comprises an endless conveyor 8 defined by an endless belt 9 having a substantially rectangular section and two opposite major lateral surfaces, one of which is a conveying surface 10 for supporting elongated elements 2 as they are fed through store 1. Conveyor 8 comprises a conveying branch 11, which, together with conveyors 5 and 7, defines the feed path between manufacturing machine A and packing machine B, extends from an input pulley 12 at input station 3 to an output pulley 13 at output station 4, and provides for feeding elongated elements 2 from input station 3 to output station 4. Conveyor 8 also comprises a return branch 14 extending from output pulley 13 to input pulley 12.

Store 1 comprises an adjusting assembly 15 for adjusting the length of conveying branch 11 and the length of return branch 14 in complementary manner, so as to adjust the capacity of store 1, and which comprises an adjusting device 16 associated with conveying branch 11, and a compensating device 17 associated with return branch 14.

Adjusting device 16 comprises a fixed frame defined by a substantially horizontal plate 18 having, on its top surface, a straight guide 19 extending between input station 3 and output station 4 and fitted with two blocks: a first block 20 fitted in a fixed position at the end of guide 19 facing input station 3; and a second block defined by a slide 21 run along guide 19 by an actuating device 22 comprising, in the example shown, a reversible motor 23 supported by plate 18, a screw 24 extending parallel to guide 19 and rotated about its axis by motor 23, and a nut screw 25 carried by slide 21 and engaged by screw 24.

Slide 21 may, obviously, be operated differently. For example, in a variation not shown, motor 23 is mounted on slide 21 and drives a pinion meshing with a rack formed along guide 19.

Figures 2, 3:
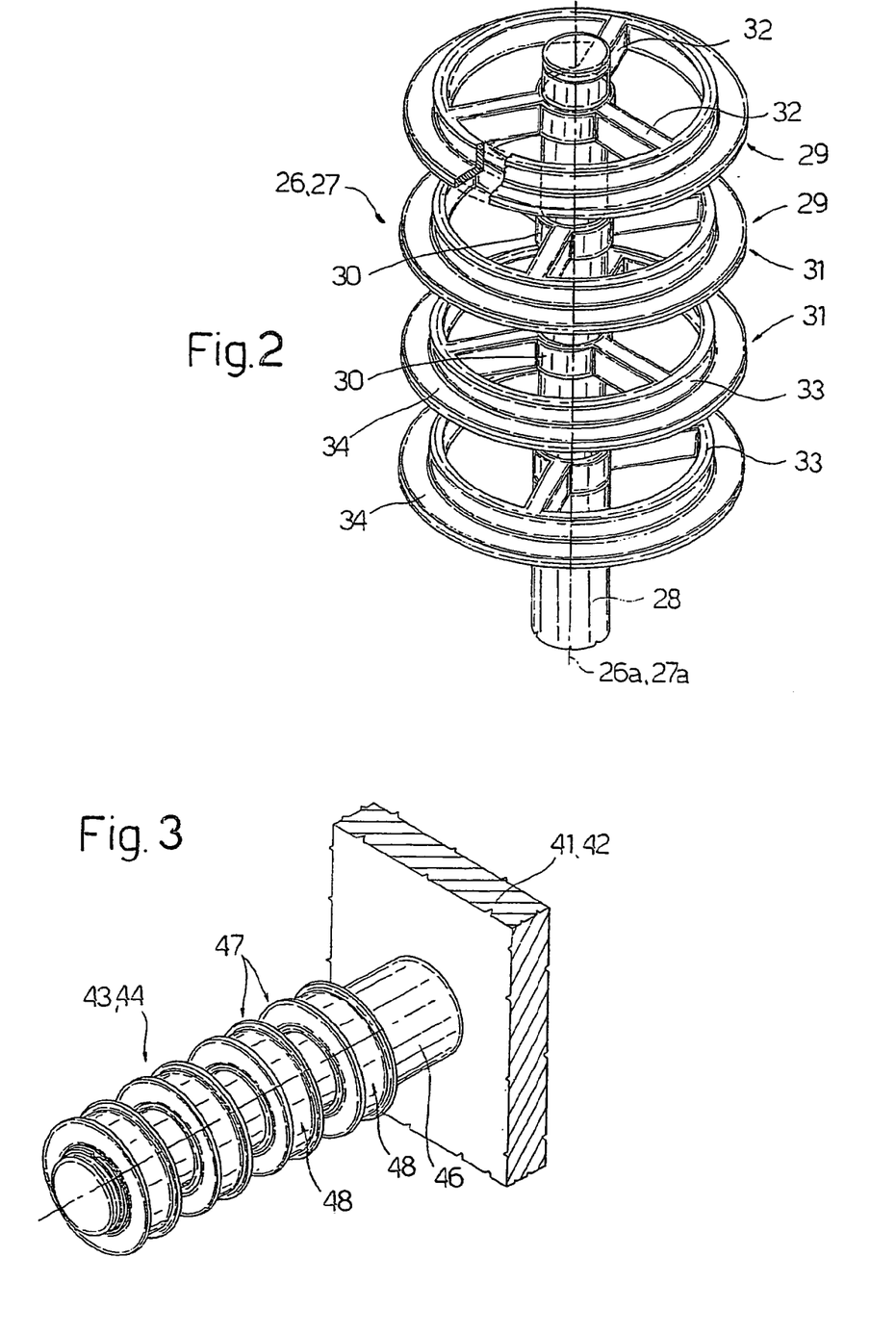
FIG. 2 shows a larger-scale view in perspective of a first detail of FIG. 1.
FIG. 3 shows a larger-scale view in perspective of a second detail of FIG. 1.

Block 20 and slide 21 support respective guide or transmission drums 26 and 27, the respective axes 26a and 27a of which extend vertically upwards with respect to plate 18. As shown in FIG. 2, each guide drum 26, 27 comprises a central, vertical, angularly fixed shaft 28, on which are equally spaced a number of pulleys 29, each of which comprises a central hub 30 fitted idly and in an axially fixed position to shaft 28; and an outer rim 31 coaxial with shaft 28 and relative hub 30, and connected integrally to hub 30 by a number of spokes 32. Rim 31 has an L-shaped section, and comprises a tubular body 33 coaxial with shaft 28; and an annular flange 34 coaxial with shaft 28, projecting outwards from the bottom end of relative tubular body 33, and of a width substantially equal to the width of belt 9 and relative conveying surface 10.

Compensating device 17 comprises two brackets 35 projecting vertically downwards from a central portion of plate 18, and having respective vertical guides 36, along each of which runs a relative slide 37. Compensating device 17 also comprises a counterweight in turn comprising, in addition to slides 37, a plate 38, which is parallel to plate 18, is located directly beneath said central portion of plate 18, is connected integrally to slides 37, and is moved, with slides 37 and with respect to plate 18, in a vertical direction 39 by a spring 40 compressed between each slide 37 and plate 18.

In a variation not shown, springs 40 are dispensed with, and slides 37 slide downwards along guides 36 solely under their own weight and the weight of plate 38.

Two flat supports 41 and 42 extend respectively vertically downwards from plate 18 and vertically upwards from plate 38, are coplanar with each other, and respectively support a number of guide or transmission drums 43 and a number of guide or transmission drums 44. Guide drums 43 and 44 have respective horizontal axes 43a and 44a crosswise to guide 19 and to axes 26a and 27a. More specifically, axes 43a are located side by side along support 41 and are equally spaced in the same plane parallel and adjacent to plate 18; and axes 44a are located side by side along support 42 and are equally spaced in the same plane parallel and adjacent to plate 38. As shown in FIG. 1, guide drums 43 are equal in number to guide drums 44, and each guide drum 43 forms, with a corresponding guide drum 44, a pair 45 of superimposed guide drums interposed between plates 18 and 38.

In the example shown, pairs 45 of guide drums are four in number, but, in other embodiments not shown, may vary from one to over four.

As shown in FIG. 3, each guide drum 43, 44 comprises a shaft 46 integral with relative support 41, 42 and coaxial with relative axis 43a, 44a; and a number of pulleys 47 equally spaced along and fitted idly to shaft 46, and having respective outer grooves 48 of a width approximately equal to but no smaller than the width of belt 9 and relative conveying surface 10.

Conveying branch 11 of conveyor 8 extends, as stated, from input pulley 12, which has a horizontal axis and is located, at input station 3, adjacent to an output pulley 49 of output conveyor 5 of manufacturing machine A; and belt 9 extends, downstream from input pulley 12, along a straight, substantially horizontal portion 50 up to the periphery of drum 27, and winds, clockwise in FIG. 1 and downwards, about both guide drums 26 and 27 to form a vertical coil 51, each turn 52 of which is supported by two corresponding pulleys 29. Conveying branch 11 is completed by a straight portion 53 extending from the lowest pulley 29 on drum 27 to output pulley 13, which is powered by a reversible motor 54 to rotate (anticlockwise in FIG. 1) about its own horizontal axis parallel to the axis of input pulley 12, and is located, at output station 4, adjacent to an input pulley 55 of input conveyor 7 of packing machine B.

Along conveying branch 11, belt 9 is positioned with conveying surface 10 facing upwards, and, along coil 51, is positioned on edge with respect to guide drums 26 and 27 and resting flat on annular flanges 34 of pulleys 29.

Along return branch 14 of conveyor 8, belt 9 extends downwards from output pulley 13, and is guided, by a series of horizontal-axis pulleys 56 carried by plate 18, towards guide drums 43 and 44 to form, about pairs 45, a succession of horizontal coils 57 arranged in series along return branch 14. Each horizontal coil 57 extends about a relative pair 45 of guide drums 43 and 44 to form a succession of turns 58, each supported by a respective pair of pulleys 47.

Along each horizontal coil 57, belt 9 is laid flat with respect to relative guide drums 43 and 44, and rests flat on relative pulleys 47, with conveying surface 10 contacting the bottom surface of relative grooves 48. By virtue of belt 9 resting flat on guide drums 43 and 44, the diameter of pulleys 47 of guide drums 43 and 44 may be more or less the same as that of pulleys 12, 13 and 56, and decidedly smaller than, e.g. a third to a fifth of, the diameter of tubular body 33 of pulleys 29.

At the end of the last horizontal coil 57, belt 9 is guided upwards to input pulley 12 by a series of pulleys 59 carried by plate 18 and similar to pulleys 56.

Pulleys 13 and 55 at output station 4 are connected on top by a plate 60 for supporting the elongated elements 2 leaving store 1, and are powered respectively by motor 54 and a motor (not shown) of packing machine B to operate belt 9 and conveyor 7 at the same linear speed and in the same direction at output station 4. Pulleys 12 and 49 at input station 3 are connected on top by a plate 61 for supporting the elongated elements 2 entering store 1, and have respective encoders 62 and 63 for measuring their angular operating speeds, and which are connected to respective inputs of a comparing circuit 64, which receives a known signal from each encoder 62, 63, and supplies a central control unit 65, controlling motor 23, with an error signal proportional to the difference between the angular speeds of pulleys 12 and 49, so as to regulate displacement of guide drum 27 with respect to guide drum 26.

In actual use, elongated elements 2 are fed continuously by conveyor 5 over plate 61 to the straight input portion 50 of conveying branch 11, and are fed by conveying branch 11 to output station 4, where the first elongated elements 2 to enter store 1 are fed over plate 60 on to conveyor 7.

In normal operating conditions, the number of elongated elements 2 fed by conveyor 5 to input station 3 equals the number of elements 2 absorbed by conveyor 7 at output station 4, and the linear speed of straight portion 50 of conveying branch 11 equals that of conveyor 5. Comparing circuit 64 supplies a zero error signal to central control unit 65, which leaves motor 23 idle and therefore makes no change in the distance between guide drums 26 and 27. In other words, in the above situation, the lengths of conveying branch 11 and return branch 14 remain unchanged.

Conversely, in the event the number of elements 2 fed to input station 3 is greater than the number of elements 2 absorbed at output station 4, comparing circuit 64 supplies an error signal to central control unit 65, which activates motor 23, and therefore the screw-nut screw transmission 24–25, so as to move guide drum 27 away from guide drum 26 and so increase the length of conveying branch 11 and the capacity of store 1. Obviously, the increase in conveying branch 11 is made at the expense of return branch 14 by moving plate 38 towards plate 18, and therefore guide drums 44 towards relative guide drums 43, in opposition to springs 40.

Conversely, in the event the number of elements 2 fed to input station 3 is smaller than the number of elements 2 absorbed at output station 4, comparing circuit 64 supplies an error signal to central control unit 65, which activates motor 23, and therefore the screw-nut screw transmission 24–25, so as to move guide drum 27 towards guide drum 26 and so reduce the length of conveying branch 11 and accordingly increase the length of return branch 14.

In connection with store 1 described above, it should be pointed out that the relatively small diameter of guide drums 43 and 44, permitted by winding belt 9 flat about pairs 45 of guide drums 43 and 44, provides for housing the whole of return branch 14 in a relatively small space. If, as in the example shown, compensating device 17 is located beneath adjusting device 16, the small volume of compensating device 17 not only enables adjusting device 16 to be located over manufacturing machine A and packing machine B, and in line with conveyors 5 and 7, but also provides for obtaining a T-shaped store 1, and for forming, on either side of compensating device 17, two recesses 66 and 67 for housing at least part of manufacturing machine A and packing machine B respectively, thus greatly reducing the overall size of the line defined by store 1 and machines A and B.

FIGS. 4–8 show a further embodiment of store 1 comprising input station 3 and output station 4 for elements 2 (not shown), located in series along feed path P of elements 2; and endless conveyor 8 defined by endless belt 9 and in turn comprising conveying branch 11 extending from input pulley 12 to output pulley 13, and return branch 14 extending from output pulley 13 to input pulley 12.

Store 1 also comprises adjusting assembly 15 for adjusting the length of conveying branch 11 and the length of return branch 14 in complementary manner to adjust the capacity of store 1, and which in turn comprises adjusting device 16 associated with conveying branch 11, and compensating device 17 associated with return branch 14.

Adjusting device 16 comprises a fixed frame defined by a parallelepiped-shaped box body 68, which supports drum 26 in a fixed position and in turn comprises straight guide 19, along which runs slide 21 supporting drum 27. More specifically, straight guide 19 is defined by a square section (shown more clearly in FIGS. 6 and 7), a top portion of which supports drum 26 and, by means of slide 21, drum 27, and a bottom portion of which supports a pair of guide drums 43 in a fixed position, and a pair of guide drums 44 by means of slide 37.

Figure 6:
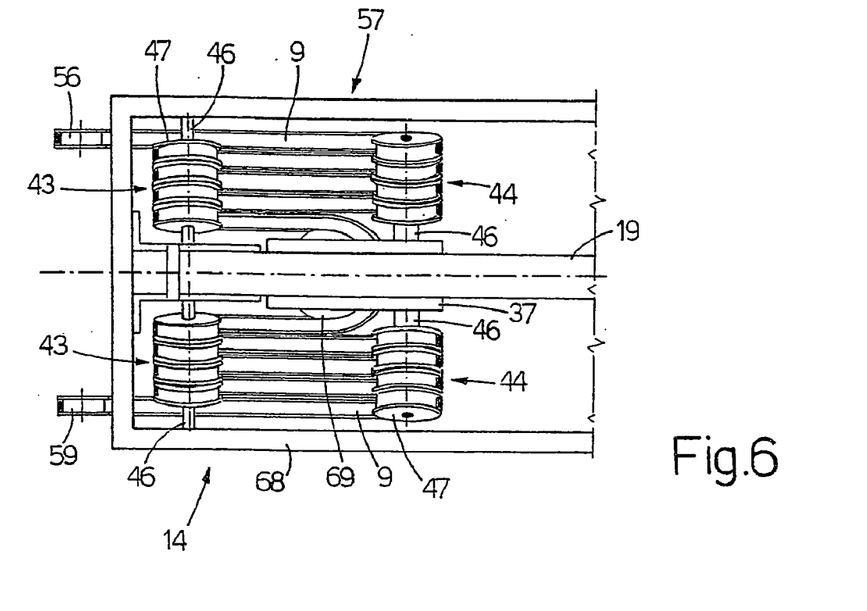
FIG. 6 shows a larger-scale plan view of a detail of the FIG. 4 store.
Figure 7:
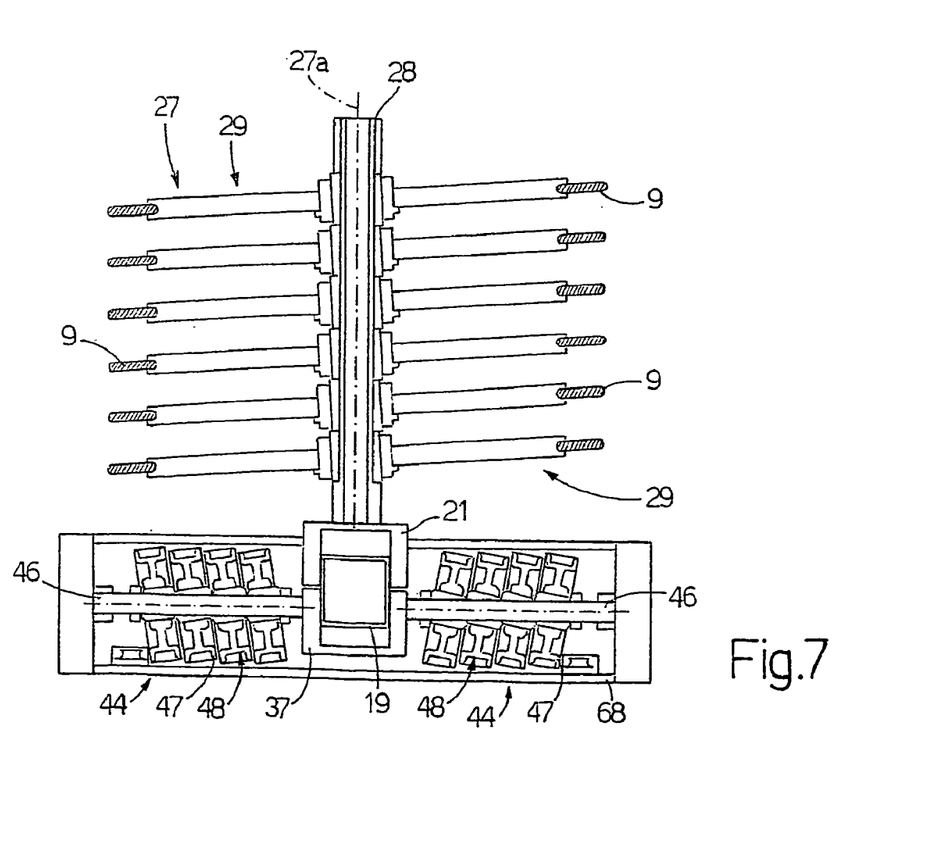
FIG. 7 shows a larger-scale front section of the FIG. 4 store.

The two guide drums 43, 44 in each pair of guide drums 43, 44 are located on opposite sides of guide 19, with their respective axes 43a, 44a perpendicular to guide 19; and each guide drum 43, 44 comprises a shaft 46, and a number of pulleys 47 fitted idly to and equally spaced along shaft 46, and having respective outer grooves 48 of a width approximately equal to but no smaller than the width of belt 9.

In addition to the two guide drums 44, slide 37 also supports a pulley 69, which is fitted idly astride guide 19 to rotate freely about a vertical axis, and allows belt 9 to pass from the guide drum 43 on one side of guide 19 to the guide drum 43 on the other side of guide 19. More specifically, the passage of belt 9 from the guide drum 43 on one side of guide 19 to the guide drum 43 on the other side of guide 19 is made possible by belt 19 winding on edge about pulley 69.

Figure 4:
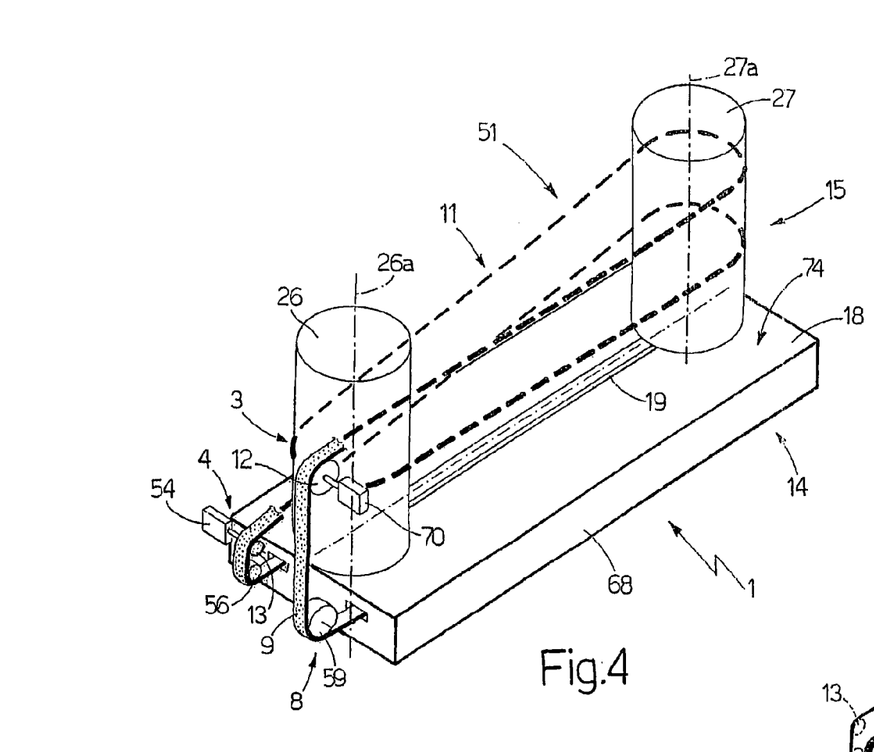
FIG. 4 shows a schematic view in perspective, with parts removed for clarity, of an alternative embodiment of a store in accordance with the present invention.
Figure 5:
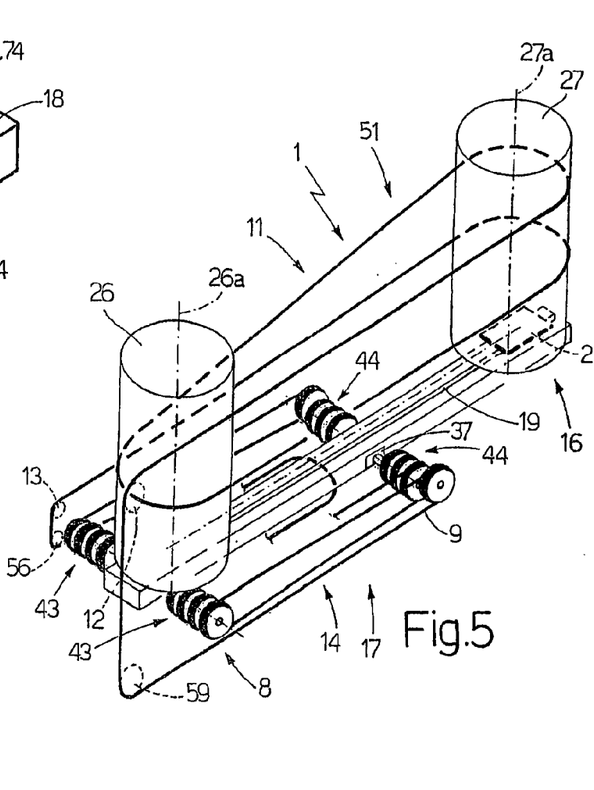
FIG. 5 shows a view in perspective, with further parts removed for clarity, of the FIG. 4 store.

Return branch 14 is therefore housed entirely inside box body 68, and drums 44 carried by slide 37 move with respect to fixed guide drums 43 along a horizontal plane defined by guide 19.

Figure 8:
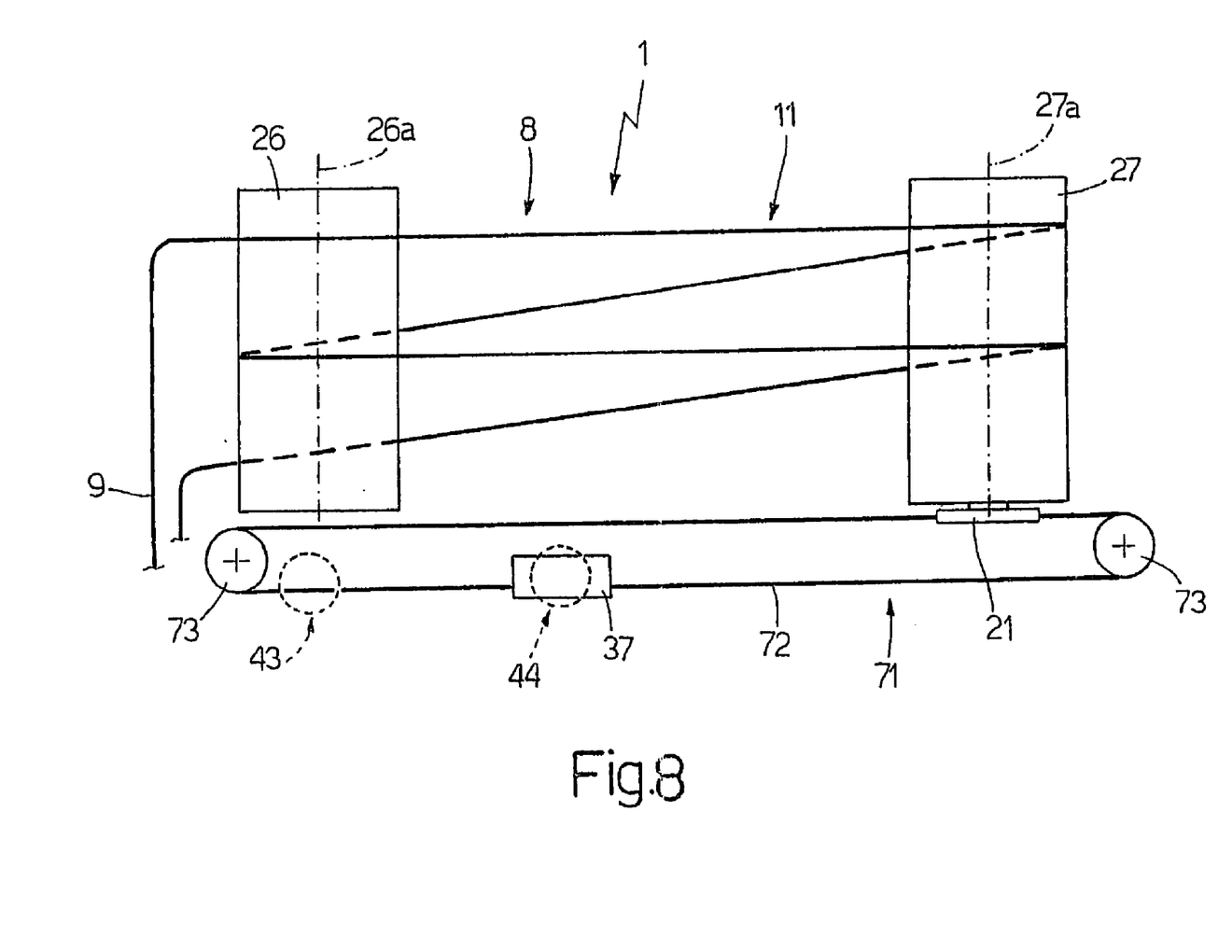
FIG. 8 shows a side view, with further parts removed for clarity, of the FIG. 4 store.

Output pulley 13 is powered by reversible motor 54 to rotate about its horizontal axis; while input pulley 12 is powered to rotate about its horizontal axis by a reversible motor 70. As shown in FIG. 8, slide 21 supporting drum 27, and slide 37 supporting guide drums 44 are connected mechanically to each other by a connecting device 71 designed so that any displacement of slide 21 corresponds to an identical displacement of slide 37 in the opposite direction. More specifically, connecting device 71 comprises an endless belt 72 looped about two end pulleys 73, which are fitted idly to box body 68 to rotate freely about respective horizontal axis; and slides 21 and 37 are connected mechanically to belt 72 so that any displacement of slide 21 corresponds to an identical displacement of slide 37 in the opposite direction.

Store 1 in FIGS. 4–8 operates in substantially the same way as store 1 in FIGS. 1–4, the only difference being that the length of conveying branch 11 and return branch 14 is adjusted, not by drive means and/or force of gravity, but solely by tensioning belt 9 by means of motor 70 fitted to input pulley 12, and motor 54 fitted to output pulley 13.

When the number of elements 2 fed to input station 3 equals the number of elements 2 absorbed at output station 4, input pulley 12 and output pulley 13 operate belt 9 at the same speed, and the length of conveying branch 11 and return branch 14 remains unchanged.

When the number of elements 2 fed to input station 3 is smaller than the number of elements 2 absorbed at output station 4, input pulley 12 operates belt 9 at a slower speed than output pulley 13, so that drum 27 fitted to slide 21 is drawn towards fixed drum 26, thus shortening conveying branch 11; and, by virtue of connecting device 71, the displacement of slide 21 corresponds to an equal displacement of slide 37 in the opposite direction, thus increasing the distance between guide drums 43 and 44, and so increasing the length of return branch 14 to compensate for the reduction in the length of conveying branch 11.

Conversely, when the number of elements 2 fed to input station 3 is greater than the number of elements 2 absorbed at output station 4, input pulley 12 operates belt 9 at a higher speed than output pulley 13, so that guide drums 44 fitted to slide 37 are drawn towards fixed guide drum 43, thus shortening return branch 14; and, by virtue of connecting device 71, the displacement of slide 37 corresponds to an equal displacement of slide 21 in the opposite direction, thus increasing the distance between drums 27 and 26, and so increasing the length of conveying branch 11 to compensate for the reduction in the length of return branch 14.

In the preferred embodiment shown in FIGS. 4–8, pulleys 29 on drum 26 are tilted, i.e. not perpendicular to relative shaft 28, and pulleys 29 on drum 27 are tilted the opposite way on relative shaft 28, so as to assist the passage of belt 9 from one pulley 29 on drum 26 to the corresponding pulley 29 on drum 27 and vice versa. Similarly, pulleys 47 on each guide drum 43 are tilted, i.e. not perpendicular to relative shaft 46, and pulleys 47 on each guide drum 44 are tilted the opposite way on relative shaft 46, so as to assist the passage of belt 9 from a pulley 47 on a guide drum 43 to the corresponding pulley 47 on guide drum 44 and vice versa.

In an embodiment not shown, a cleaning member is provided to clean the top surface 74 of box body 68, on which powdered tobacco from elements 2 on conveying branch 11 of store 1 tends to deposit. The cleaning member preferably comprises a movable head having a brush and/or suction member, and which is fitted to slide 21 and moved along the whole of top surface 74 during normal operation of store 1.

What is claimed is:

1. A variable-capacity store for objects, the store (1) comprising an input station (3) and an output station (4) arranged in series along a feed path (P) of the objects (2); an endless conveyor (8) comprising a conveying branch (11) for conveying said objects (2) along said path (P) and forming a first coil (51) of a first given length about a pair of first guide drums (26, 27), and a return branch (14) forming at least a second coil (57) of a second given length about a pair of second guide drums (43, 44); and adjusting means (15) for adjusting said lengths in complementary manner; said conveyor (8) comprising a conveyor belt (9) having a flat conveying surface (10), which is positioned on edge with respect to the first guide drums (26, 27) and along the first coil (51); characterized in that the flat conveying surface (10) of the conveyor belt (9) is positioned flat against the second guide drums (43, 44) and along the second coil (57).

2. A store as claimed in claim 1, wherein the diameter of said second guide drums (43, 44) is smaller than the diameter of said first guide drums (26, 27).

3. A store as claimed in claim 1, wherein the diameter of said second guide drums (43, 44) is one third to one fifth of the diameter of said first guide drums (26, 27).

4. A store as claimed in claim 1, wherein said first guide drums (26, 27) are perpendicular to said second guide drums (43, 44).

5. A store as claimed in claim 1, wherein said first guide drums (26, 27) have respective vertical first axes (26a, 27a), and said second guide drums (43, 44) have respective horizontal second axes (43a, 44a).

6. A store as claimed in claim 1, wherein said second guide drums (43, 44) are located beneath said first guide drums (26, 27).

7. A store as claimed in claim 1, wherein said first guide drums (26, 27) are located a first distance apart, and said second guide drums (43, 44) are located a second distance apart; said adjusting means (15) comprising an adjusting device (16) for adjusting said first distance and, therefore, said first length, said adjusting device (16) comprising said first guide drums (26, 27); and a compensating device (17) for adjusting said second distance and, therefore, said second length in complementary manner with respect to said first length, said compensating device (17) comprising said second guide drums (43, 44).

8. A store as claimed in claim 7, wherein said adjusting device (16) comprises a frame (18, 68) supporting said first guide drums (26, 27); and said compensating device (17) is suspended from said frame (18, 68) and located beneath the frame (18, 68).

9. A store as claimed in claim 7, wherein said compensating device (17) comprises first and second supporting means (41, 42) movable with respect to each other in a direction (39) crosswise to said second guide drums (43, 44), and each supporting a respective said second guide drum (43) (44) in said pair of second guide drums (43, 44).

10. A store as claimed in claim 9, wherein said first supporting means (41) are integral with said frame (18, 68), and said second supporting means (42) are connected to said frame (18, 68) to move with respect to the frame (18, 68) in said direction (39).

11. A store as claimed in claim 1, wherein said compensating device (17) is located beneath a central portion of said frame (18, 68), and defines, beneath the frame (18, 68), two recesses (66, 67) located on opposite sides of the compensating device (17) and for respectively receiving, at least partly, supply means (A) supplying said objects (2) to the store (1), and receiving means (B) receiving said objects (2) from the store (1).

12. A store as claimed in claim 1, wherein said direction (39) is a vertical direction.

13. A store as claimed in claim 12, wherein said second supporting means (42) are located beneath said first supporting means (41), and are moved from and to said first supporting means (41) at least partly by and, respectively, in opposition to the force of gravity.

14. A store as claimed in claim 1, and also comprising elastic means (40) compressed between said first (41) and second (42) supporting means.

15. A store as claimed in claim 1, wherein said direction (39) is a horizontal direction.

16. A store as claimed in claim 15, wherein a fixed first guide drum (26) and a fixed second guide drum (43) are carried in a fixed position by a frame (68); a straight guide (19) being connected to the frame (68) to support in sliding manner a movable first guide drum (27) and a movable second guide drum (44).

17. A store as claimed in claim 16, wherein a first slide (21) supporting the movable first guide drum (27) runs along a top portion of the guide (19), and a second slide (37) supporting the movable second guide drum (44) runs along a bottom portion of the guide (19).

18. A store as claimed in claim 1, wherein two pairs of second guide drums (43, 44) are located on opposite sides of said guide (19).

19. A store as claimed in claim 18, wherein said second slide (37) supports a transition pulley (69) fitted idly astride the guide (19) and rotating freely about a vertical axis to permit passage of the conveyor belt (9) from the pair of second guide drums (43, 44) on one side of the guide (19) to the pair of second guide drums (43, 44) on the other side of the guide (19); the flat conveying surface (10) of the conveyor belt (9) being positioned on edge with respect to said transition pulley (69).

20. A store as claimed in claim 1, wherein the conveyor (8) is moved by a powered input pulley (12) located at the input station (3), and by a powered output pulley (13) located at the output station (4); the movable first guide drum (27) and the movable second guide drum (44) being mounted to slide freely along the straight guide (19); and a connecting device (71) being provided, which is so designed that any displacement of the movable first guide drum (27) corresponds to an identical displacement of the movable second guide drum (44) in the opposite direction.

21. A store as claimed in claim 20, wherein the connecting device (71) comprises an endless belt (72) looped about two idle end pulleys (73) and connected mechanically to both the movable first guide drum (27) and the movable second guide drum (44).

22. A store as claimed in claim 1, wherein the frame (68) is defined by a parallelepiped-shaped box body housing the pair of second guide drums (43, 44) and the second coil (57).

23. A store as claimed in claim 22, wherein said frame (68) has a top surface (74); cleaning means being provided to clean the top surface (74) of the frame (68).

24. A store as claimed in claim 23, wherein the cleaning means comprise a movable head connected to a movable first guide drum (27).

25. A store as claimed in claim 24, wherein the movable head comprises a brush.

26. A store as claimed in claim 1, wherein each guide drum (26, 27; 43, 44) in each pair of guide drums (26, 27; 43, 44) comprises a respective number of pulleys (29; 47) fitted to a corresponding central shaft (28; 46); the pulleys (29; 47) of each guide drum (26, 27; 43, 44) in each pair of guide drums (26, 27; 43, 44) being fitted to the corresponding central shaft (28; 46) on a tilt differing from that of the pulleys (29; 47) of the other guide drum (27, 26; 44, 43).

27. A store as claimed in claim 1, and comprising a number of said second coils (57) arranged in series along said return branch (14) and supported by respective said pairs of second guide drums (43, 44).

28. A store as claimed in claim 1, wherein said first guide drums (26, 27) are perpendicular to said second guide drums (43, 44); said first guide drums (26, 27) have respective vertical first axes (26*a*, 27*a*), and said second guide drums (43, 44) have respective horizontal second axes (43*a*, 44*a*) and are located beneath said first guide drums (26, 27).

29. A store as claimed in claim 28, wherein the diameter of said second guide drums (43, 44) is smaller than the diameter of said first guide drums (26, 27).

30. A store as claimed in claim 1, and comprising a number of said second coils arranged in series along said return branch (14) and supported by respective said pairs of second guide drums (43, 44).

31. A store as claimed in claim 1, for containing objects defined by elongated elements (2), in particular cigarettes.

* * * * *